(12) United States Patent
Walstra et al.

(10) Patent No.: US 6,396,446 B1
(45) Date of Patent: *May 28, 2002

(54) MICROWAVE ANTENNA FOR USE IN A VEHICLE

(75) Inventors: Eric J. Walstra, Grand Rapids; Robert R. Turnbull, Holland, both of MI (US)

(73) Assignee: Gentex Corporation, Zeeland, MI (US)

(*) Notice: Subject to any disclaimer, the term of this patent is extended or adjusted under 35 U.S.C. 154(b) by 0 days.

This patent is subject to a terminal disclaimer.

(21) Appl. No.: 09/535,999

(22) Filed: Mar. 28, 2000

Related U.S. Application Data

(63) Continuation-in-part of application No. 09/250,086, filed on Feb. 16, 1999, now Pat. No. 6,166,698.

(51) Int. Cl.$^7$ ............................................. H01Q 1/32
(52) U.S. Cl. ............................. 343/713; 343/700 MS
(58) Field of Search ........................... 343/713, 711, 343/700 MS

(56) References Cited

U.S. PATENT DOCUMENTS

| | | | |
|---|---|---|---|
| 4,210,357 A | 7/1980 | Adachi | 296/84 |
| 5,043,738 A * | 8/1991 | Shapiro et al. | 343/700 MS |
| 5,166,692 A | 11/1992 | Nishikawa et al. | 342/422 |
| 5,173,708 A | 12/1992 | Suzuki et al. | 342/359 |
| 5,241,319 A | 8/1993 | Shimizu | 342/358 |
| 5,448,250 A | 9/1995 | Day | 343/700 |
| 5,504,478 A * | 4/1996 | Knapp | 340/825.69 |
| 5,512,901 A | 4/1996 | Chen et al. | 342/175 |
| 5,521,604 A | 5/1996 | Yamashita | 342/359 |
| 5,557,285 A | 9/1996 | Bender et al. | 342/359 |
| 5,629,709 A | 5/1997 | Yamashita | 342/359 |
| 5,706,015 A | 1/1998 | Chen et al. | 343/700 |
| 5,828,337 A | 10/1998 | Aoshima et al. | 342/359 |
| 5,959,581 A * | 9/1999 | Fusinski | 343/700 MS |
| 5,973,648 A | 10/1999 | Lindermeier et al. | 343/713 |
| 6,011,518 A * | 1/2000 | Yamagishi et al. | 343/713 |
| 6,052,084 A | 4/2000 | Aoshima et al. | 342/358 |
| 6,052,645 A | 4/2000 | Harada | 701/212 |
| 6,081,237 A * | 6/2000 | Sato et al. | 343/713 |
| 6,166,698 A * | 12/2000 | Turnbull et al. | 343/713 |

FOREIGN PATENT DOCUMENTS

| | | | |
|---|---|---|---|
| EP | 452970 | 10/1991 | H01Q/1/32 |
| EP | 555586 | 8/1993 | G01C/21/20 |
| EP | 567268 | 10/1993 | G01S/5/14 |
| EP | 690289 | 6/1994 | G01C/21/20 |
| EP | 685705 | 12/1995 | G01C/21/20 |
| JP | 63262904 | 10/1988 | H01Q/3/02 |
| JP | 4336821 | 11/1992 | H01Q/3/02 |
| JP | 5142321 | 6/1993 | G01S/3/44 |
| JP | 6102334 | 4/1994 | H01Q/3/08 |
| JP | 6104780 | 4/1994 | H01Q/3/04 |
| WO | 9520249 | 7/1995 | H01Q/1/32 |

* cited by examiner

*Primary Examiner*—Don Wong
*Assistant Examiner*—Hoang Nguyen
(74) *Attorney, Agent, or Firm*—Price, Heneveld, Cooper, DeWitt & Litton

(57) ABSTRACT

A microwave antenna for mounting in a vehicle where the antenna includes a dielectric substrate, a conductive resonant patch mounted on one side of the dielectric substrate for receiving signals from a satellite, and a conductive ground plane mounted to an opposite side of the dielectric substrate. The ground plane has an area sufficiently large to shield the resonant patch from any satellite signals that are reflected from a conductive component of the vehicle. The resonant component need not be a patch antenna, but may have another structure such as a helical antenna. The antenna is preferably mounted in a rearview mirror assembly, and the ground plane is configured to shield the resonant component from satellite signals reflected from the mirror.

26 Claims, 6 Drawing Sheets

MICROWAVE ANTENNA FOR USE IN A VEHICLE

CROSS-REFERENCE TO RELATED APPLICATION

This application is a continuation in part of commonly assigned U.S. patent application Ser. No. 09/250,086 entitled REARVIEW MIRROR WITH INTEGRATED MICROWAVE RECEIVER, filed on Feb. 16, 1999, by Robert R. Turnbull et al., now U.S. Pat. No. 6,166,698, the entire disclosure of which is hereby incorporated by reference.

BACKGROUND OF THE INVENTION

The present invention generally relates to a rearview mirror assembly for a vehicle and to microwave antenna constructions.

Vehicle position identification systems are known and commonly used in vehicles for purposes relating to vehicle navigation and tracking systems. Currently, two such position identification systems that are in use are GPS and GLONASS, both of which utilize a constellation of satellites that transmit microwave signals towards the earth that, in turn, are received by a ground-based microwave receiver and used to determine the position of the receiver on the earth's surface. Such systems are capable of a very high degree of accuracy. As a result, a great deal of research has been conducted to construct navigation systems that may be readily incorporated into a vehicle.

Position identification systems have also been used in vehicles with respect to communication systems, particularly emergency communication systems, whereby a vehicle occupant making an emergency call using a cellular telephone need not actually know the vehicle's exact location in order to have emergency vehicles dispatch to that location. An example of such a system is the ONSTAR® system from General Motors Corporation. Other uses of position identification systems in vehicles include the use of position information to identify the time zone that the vehicle is currently in, and the use of such position data to determine which zone of magnetic variance the vehicle is in for purposes of calibrating an in-vehicle electronic compass. See U.S. Pat. Nos. 5,724,316 and 5,761,094, respectively.

Related U.S. Pat. Nos. 6,166,698 and 5,971,552 disclose the mounting of the microwave antenna in a rearview mirror assembly of a vehicle. As disclosed in related U.S. Pat. No. 6,166,698, it is desirable to mount the microwave antenna to the mounting bracket of an inside rearview mirror assembly so that the antenna has a clear view through the sloped front windshield of much of the sky above and in front of the vehicle. Additionally, the front windshield of the vehicle protects the antenna from dirt, moisture, snow, and humid air that may readily reach the microwave antenna and adversely affect its performance if it is mounted in a component on the exterior of the vehicle.

An inside rearview mirror assembly constructed in accordance with the teachings of U.S. Pat. No. 6,166,698 is shown in FIGS. 1–5. FIG. 1 shows the general mounting of rearview mirror assembly 10 to the inside surface of a front windshield 20 of a vehicle 25. FIGS. 2A and 2B show two different exemplary rearview mirror assembly constructions in which the microwave antenna may be mounted. More specifically, rearview mirror assembly 10a shown in FIG. 2A is designed to be mounted directly to windshield 20, whereas rearview mirror assembly 10b shown in FIG. 2B is mounted to the roof of the vehicle.

In general, rearview mirror assemblies include a mirror housing 30 that may have a wide variety of the possible designs, such as, for example, the mirror housing taught and claimed in U.S. Pat. No. 5,448,397. Rearview mirror assemblies also include a mirror 40 (FIG. 5) mounted in mirror housing 30, and a mounting bracket 35 that attaches mirror housing 30 to the vehicle. Such mounting brackets typically include a mounting foot 36 that is directly mounted to the vehicle and to a mirror stem 38 that extends between mounting foot 36 and mirror housing 30. As apparent from a comparison of FIGS. 2A and 2B, the structure of mounting foot 36 and mirror stem 38 may vary considerably from one rearview mirror assembly to the next. For example, mirror stem 38 may be pivotally mounted to mounting foot 36 as shown in FIG. 2A or fixedly attached to mounting foot 36 as shown in FIG. 2B. Additionally, mirror housing 30 is typically pivotally attached to mirror stem 38. Such pivotal attachments allow the driver to move and position the mirror so as to allow the driver to have a clear field of view towards the rear of the vehicle. The disclosed rearview mirror assembly also includes a display 45 (FIG. 5) housed within mirror housing 30 or housed within mounting foot 36.

As shown in FIGS. 3 and 4, a microwave antenna 50 is mounted within mounting foot 36 of mounting bracket 35 of rearview mirror assembly 10. As shown in FIG. 3, mounting foot 36 includes a mounting portion 52 and an antenna housing portion 54. The structure of mounting portion 52 is shown as being configured to attach to a mounting puck or button 56 that is attached to the inside surface of windshield 20 using an adhesive. Puck 56 includes an inclined edge surface 57 and a threaded aperture 58 formed in the surface of puck 56 opposite that which is adhered to windshield 20. Mounting portion 52 thus has an aperture 60 for engaging puck 56. One edge 62 of aperture 60 is a sloped profile so as to engage incline edge surface 57 of puck 56. In this manner, the size of aperture 60 is slightly smaller than the area of the surface of puck 56 that is opposite that which is secured to windshield 20. To then secure mounting portion 52 to puck 56, a set screw 66 is slid into an aperture 64 formed in mounting portion 52 and turned so as to thread into threaded aperture 58 on puck 56.

Antenna housing portion 54 of mounting foot 36 may be integrally formed with mounting portion 52 or formed as a separate component that may be attached to mounting portion 52. Antenna housing portion 54 includes an aperture 70 having a generally square, rectangular, or round shape or any other shape for accommodating the particular shape of antenna 50. Aperture 70 is provided so as to open towards windshield 20 through which microwave signals from satellites may pass to reach microwave antenna 50. Antenna 50 is preferably mounted in aperture 70 so as to be substantially parallel to, and slightly spaced apart from, the inner surface of windshield 20. The structure of antenna 50 is discussed further below.

As shown in FIG. 3, a foam pad 72 or other non-conductive substrate is placed within antenna housing portion 54 between antenna 50 and the inside surface of windshield 20. As shown in FIG. 4, antenna mounting portion 54 also includes a gasket 74 provided about the periphery of aperture 70, so as to provide for additional protection against moisture or debris coming between windshield 20 and antenna 50.

In addition to providing space for accommodating antenna 50, mounting foot 36 is configured to provide sufficient space for a receiver circuit 80 printed on a circuit board 82. Circuit board 82 is thus mounted directly behind antenna 50 in antenna mounting portion 54, so as to minimize the length of antenna connector 84 that extends between antenna 50 and printed circuit board 82.

Because receiver circuit 80 converts the signals received by antenna 50 into signals that may be transmitted over conventional wires, the information obtained from the satellite signals may be transmitted to other components in the vehicle via the vehicle bus or by discrete connections. More specifically, if a display 45 or additional circuitry, such as a control circuit for an electrochromic mirror or electronic compass, is mounted in mirror housing 30, receiver circuit 80 may be coupled to such circuitry via a connector line 85 that may be run between mounting foot 36 and mirror housing 30 outside of mirror stem 38 or internally through mirror stem 38 as disclosed in U.S. Pat. No. 5,984,482. Additionally, data processed by receiver circuit 80 may be transmitted via line 86 to other electrical systems within the vehicle. Mirror assembly 10 may include a shroud 88 that extends from mounting foot 36 to the vehicle headliner, so as to provide a covert channel for running cabling 86 between rearview mirror assembly 10 and the remainder of the vehicle.

As shown in FIGS. 3 and 4, microwave antenna 50 is constructed as a patch antenna including a dielectric substrate 90 having a layer of a conductive material provided on one side of dielectric substrate 90 so as to form a resonant patch 92. Antenna 50 further includes a layer of electrically conductive material on the opposite side of dielectric substrate 90, which forms a conductive ground plane 94 for antenna 50.

The above-described antenna mounting construction operates quite well. However, it has been discovered that there are certain circumstances in which the signal from a satellite within the field of view of antenna 50 would disappear and then reappear after the satellite moves to a new position in the sky or the vehicle moves to a new position relative to the satellite. Therefore, there exists a need for a modification to the above-described system so as to eliminate the system's susceptibility to such blindspots.

SUMMARY OF THE INVENTION

One aspect of the present invention is to provide a microwave antenna for mounting in a vehicle where the antenna comprises a dielectric substrate, a conductive resonant patch mounted on one side of the dielectric substrate for receiving signals from a satellite, and a conductive ground plane mounted to an opposite side of the dielectric substrate. The ground plane has an area sufficiently large to shield the resonant patch from satellite signals that are reflected from a conductive component of the vehicle that would otherwise cause destructive interference with a signal received directly from a satellite.

Another aspect of the invention is to provide a mirror mounting bracket for mounting an inside rearview mirror assembly to a vehicle. The mirror mounting bracket comprises a mounting foot including a mounting portion for mounting said rearview mirror assembly to an inside surface of the front windshield of a vehicle, and an antenna housing portion abutting the inside surface of the front windshield and having an aperture opening towards the inside surface of the front windshield. The mounting bracket further comprises a stem extending between the mounting portion and a mirror housing of the rearview mirror assembly, and a microwave antenna mounted in the aperture of the antenna housing of the mounting foot. The microwave antenna including a conductive ground plane and a resonant component for receiving signals from a satellite. The ground plane is positioned in the antenna housing to shield the resonant patch from any satellite signals that are reflected from a conductive component of the vehicle.

Another aspect of the invention is to provide a mirror mounting bracket for mounting an inside rearview mirror assembly to a vehicle. The mirror mounting bracket comprises a mounting foot including a mounting portion for mounting said rearview mirror assembly to an inside surface of the front windshield of a vehicle, and an antenna housing portion abutting the inside surface of the front windshield and having an aperture opening towards the inside surface of the front windshield. The mounting bracket further comprises a stem extending between the mounting portion and a bezel of the rearview mirror assembly, and a microwave antenna mounted in the aperture of the antenna housing of the mounting foot. The microwave antenna including a conductive ground plane and a resonant component for receiving signals from a satellite. The ground plane is positioned in the antenna housing to shield the resonant patch from any satellite signals that are reflected from a conductive component of the vehicle.

An additional aspect of the present invention is to provide a method of preventing destructive interference between satellite signals reflected from conductive vehicle components and satellite signals directly received by a microwave antenna positioned in a vehicle. The method comprises the step of providing a conductive ground plane between a resonant component of the microwave antenna and any conductive vehicle component that may reflect a satellite signal towards the resonant component that would otherwise cause destructive interference with a signal received directly from a satellite.

These and other features, advantages, and objects of the present invention will be further understood and appreciated by those skilled in the art by reference to the following specification, claims, and appended drawings.

DETAILED DESCRIPTION OF THE PREFERRED EMBODIMENTS

Figure 1:
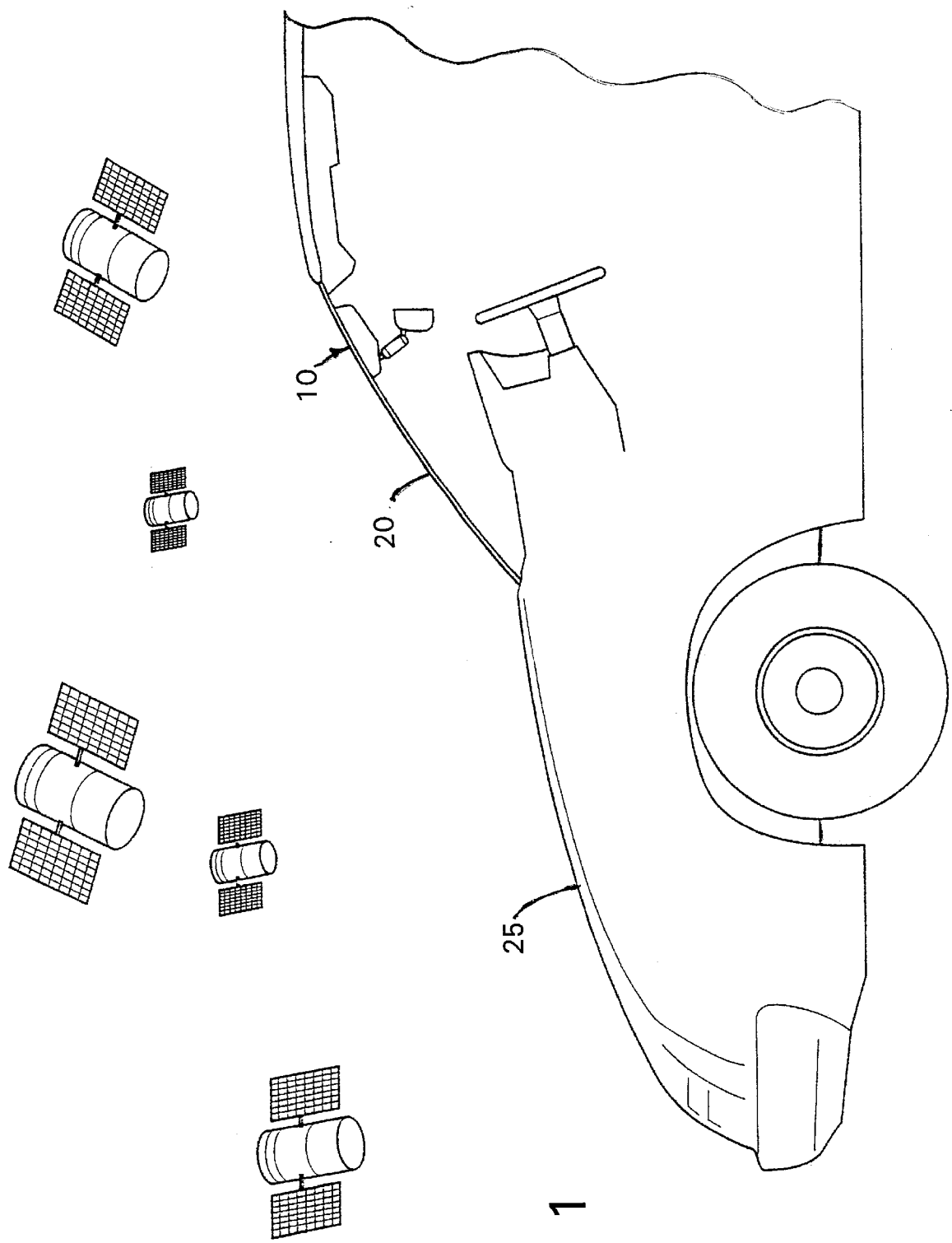
FIG. 1 is a cut-away perspective view of a vehicle in which a rearview mirror assembly is mounted.
Figure 2A:
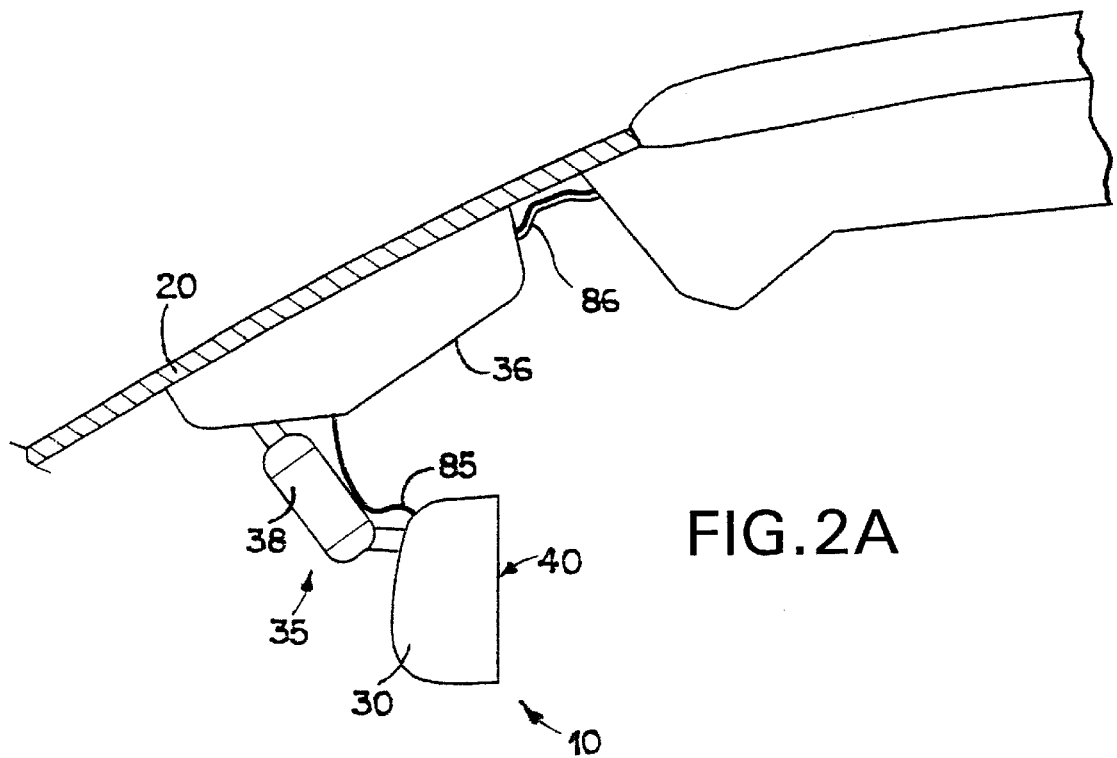
FIG. 2A is a perspective side view of a rearview mirror assembly.
Figure 2B:
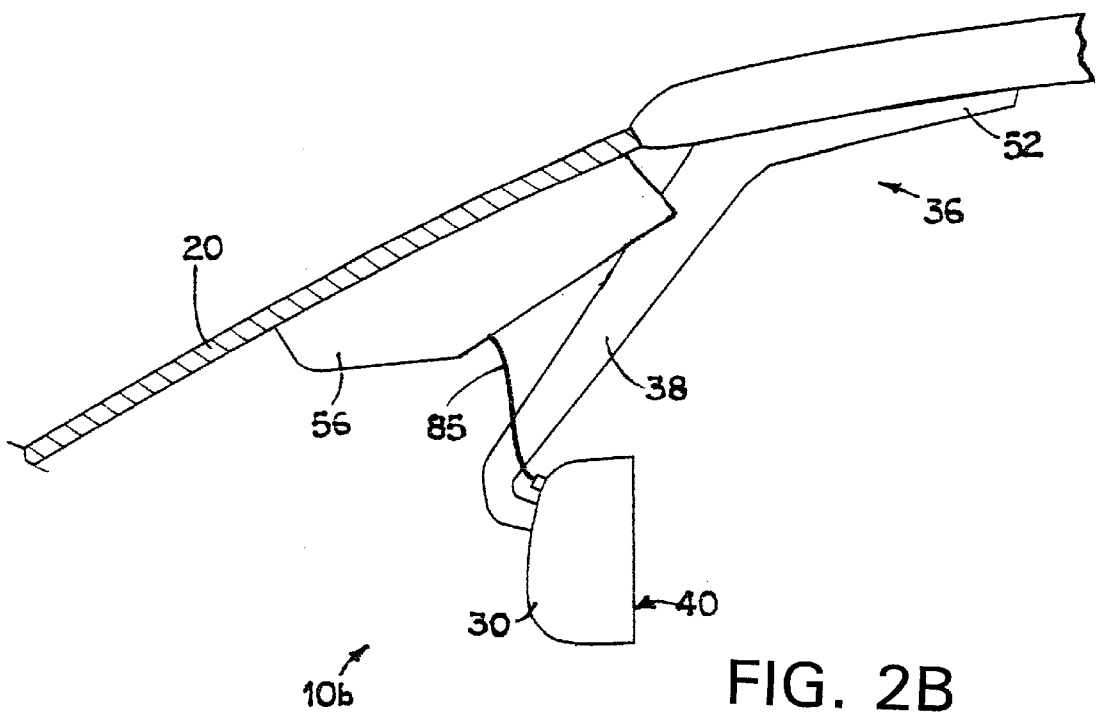
FIG. 2B is a perspective side view of another rearview mirror assembly.
Figure 3:
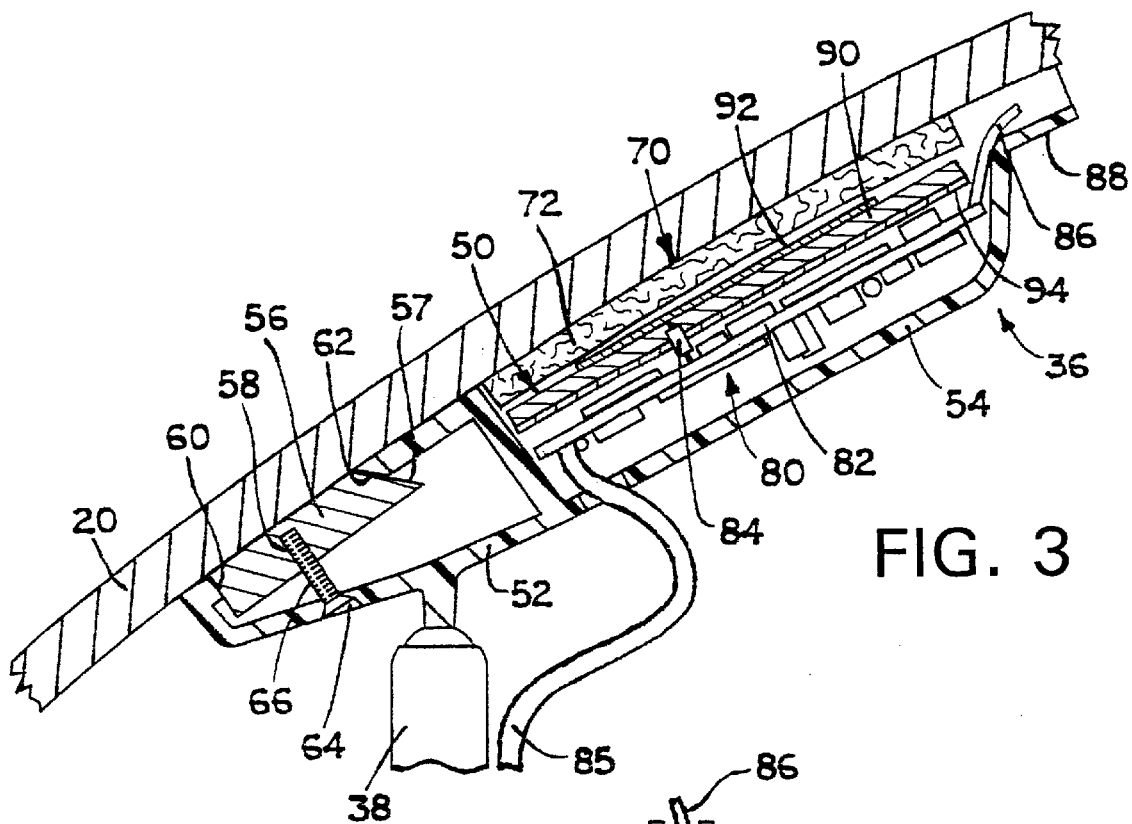
FIG. 3 is a cross-sectional view of the mounting foot of a rearview mirror assembly.
Figure 4:
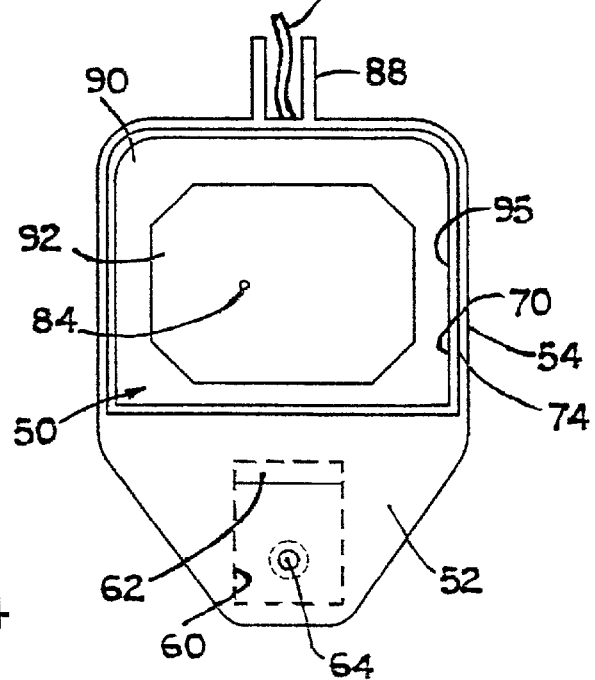
FIG. 4 is a perspective view of the forward-facing portion of the mounting foot of the rearview mirror assembly shown in FIG. 3.
Figure 5:
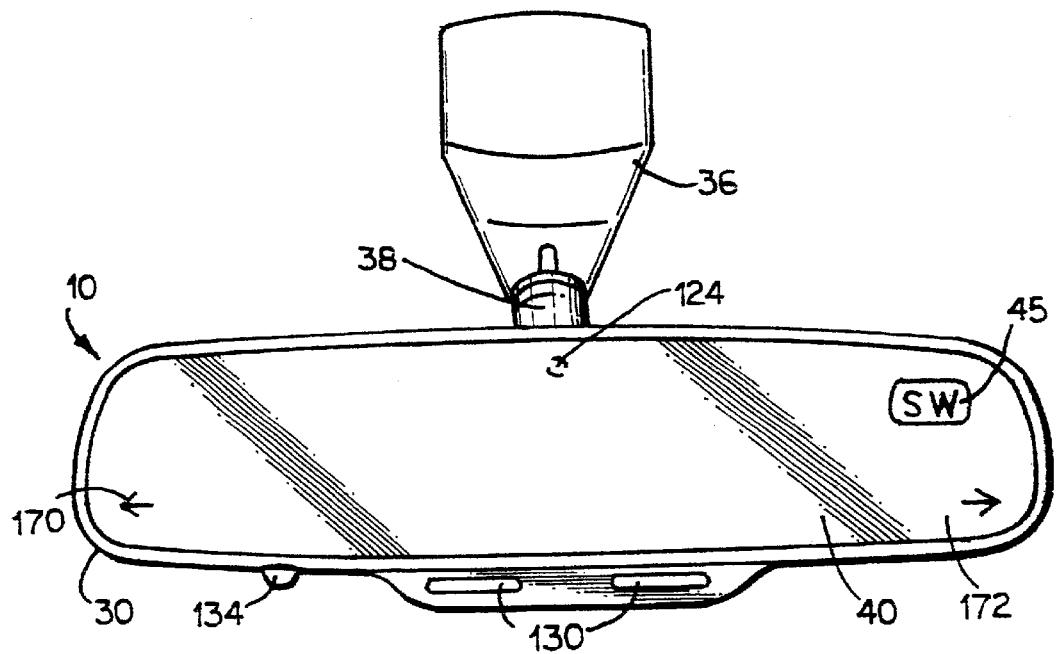
FIG. 5 is a rearward perspective view of the rearview mirror assembly shown in FIG. 2A.

Reference will now be made in detail to the present preferred embodiments of the invention, examples of which are illustrated in the accompanying drawings. Wherever possible, the same reference numerals will be used throughout the drawings to refer to the same or like parts.

Figure 6:
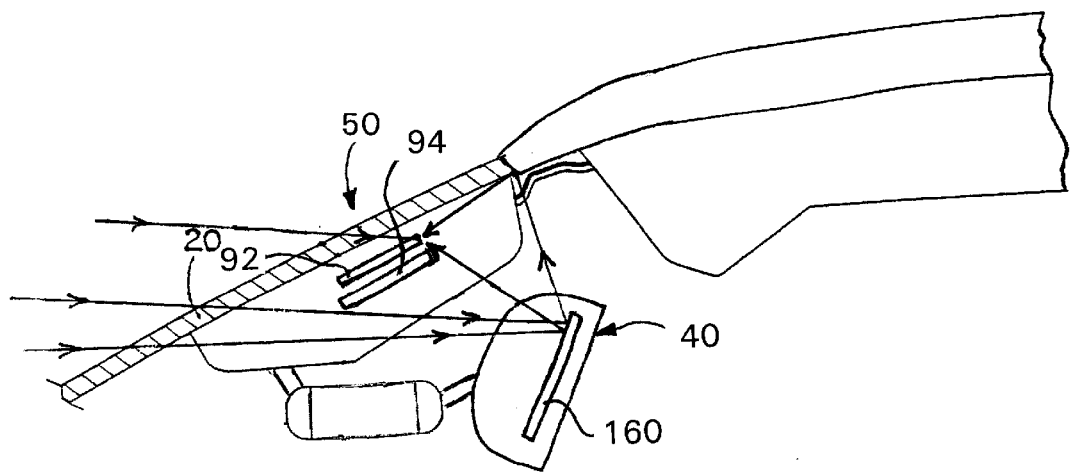
FIG. 6 is a perspective side view of a rearview mirror assembly.

The present invention pertains to modifications that may be made to a microwave antenna to reduce the susceptibility of a microwave receiver system to certain blindspots that appear in portions of the sky to which the antenna is exposed. Upon noting the appearance of the blindspots in the above-described microwave receiver system, the inventor subsequently discovered that the blindspots were caused by reflections of the satellite signals from conductive components of the vehicle, such as the metallic reflective layer of the rearview mirror, the front edge of the vehicle roof, the vehicle hood, and the A-pillars. As illustrated in FIG. 6, for example, when mirror 40 and its reflective layer 160 are in a position relative to antenna 50 and a satellite is positioned in a particular location in the sky, the resonant component 92 of antenna 50 may receive not only the direct transmissions from the satellite, but may also receive a phase-shifted version of the same satellite signal that is reflected from metallic layer 160 of mirror 40 and/or other conductive components of the vehicle. In certain circumstances, the reflected signal causes destructive interference with the directly received signal thereby canceling out one another and causing the microwave receiver system to perceive the above-noted blindspots. Such destructive interference primarily occurs when the conductive component from which the signal is reflected is positioned between about one-eighth to two wavelengths from the resonant component (i.e., GPS signals have a wavelength of about 2 cm).

To solve the above problem, a microwave antenna 150 of the present invention (shown in FIG. 7) utilizes a larger ground plane 194 and/or strategically positioned ground plane. Ground plane 194 is designed to be sufficiently large and/or positioned so as to block reflected satellite signals from reflective layer 160 from reaching resonant patch 92 regardless of the positioning of mirror 40 or the transmitting satellite relative to the vehicle. It will be appreciated that the requisite size of ground plane 194 will depend on the relative positioning of microwave antenna 150 relative to reflective layer 160 and other conductive components of the vehicle. Thus, for example, the size, shape and positioning of ground plane 194 may vary depending upon the mirror mount construction, the proximity of the resonant component of the antenna to the front edge of the roof and mirror, and the relative angular positioning of these various components. In general, to block reflected satellite signals from reaching resonant component 92, ground plane 194 should be sized, shaped and positioned so as to fall within the line of sight between resonant component 92 and the conductive components from which satellite signals may be reflected and otherwise reach resonant component 92.

To the extent that the satellite signals are polarized, a signal reflected off a single conductive vehicle component may not cause destructive interference since the reflection would cause the signal to change polarity. Nevertheless, such a reflected signal may reflect off another conductive component of the vehicle towards the resonant component of the antenna and hence re-obtain the same polarization as a signal received directly from the satellite. Therefore, the ground plane should be configured to shield the resonant component from reflections from any conductive component that could cause a doubly-reflected signal to reach the resonant component.

Figure 8:
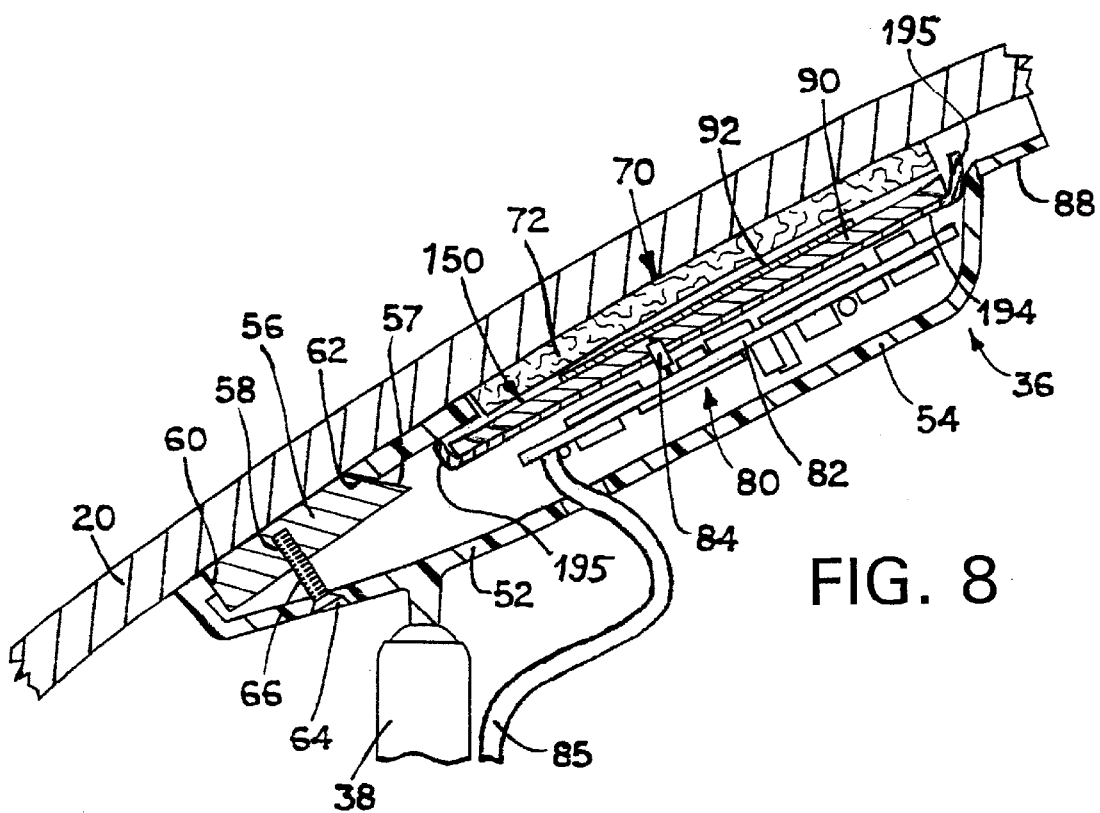
FIG. 8 is a cross-sectional view of the mounting foot of the rearview mirror assembly of the present invention.
Figure 7:
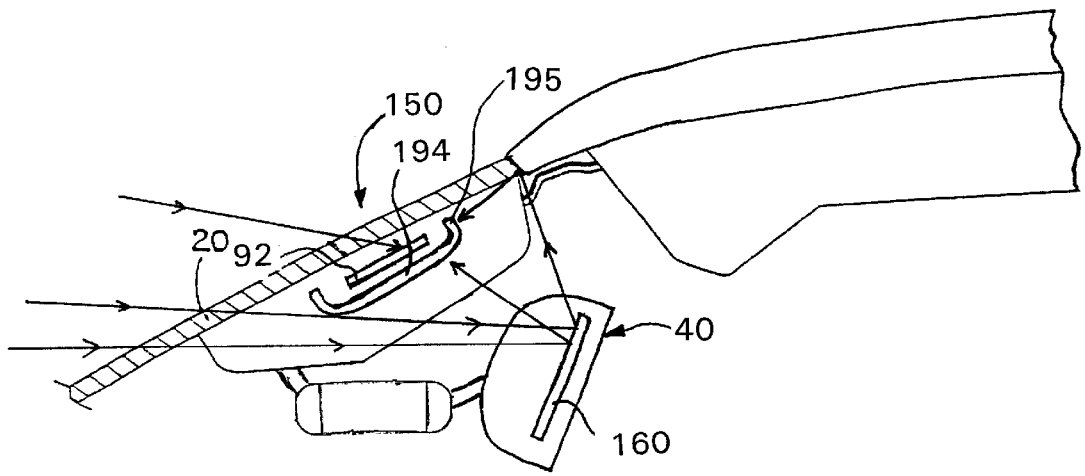
FIG. 7 is a perspective side view of a rearview mirror assembly constructed in accordance with the present invention.

As shown in FIGS. 7 and 8, ground plane 194 may include edge portions 195 that are bent forward and around dielectric layer 90 to provide additional shielding of resonator patch 92. Any one or more side edges of ground plane 194 may be shaped in such a manner and, conceivably, all four edges of ground plane 194 may be bent to form a cup-like shape. By providing such bent edges, ground plane 194 may be configured to shield resonant plane 92 from first or second reflections from a front edge of the vehicle roof as well as from first or second reflections from mirror 40.

Figure 9:
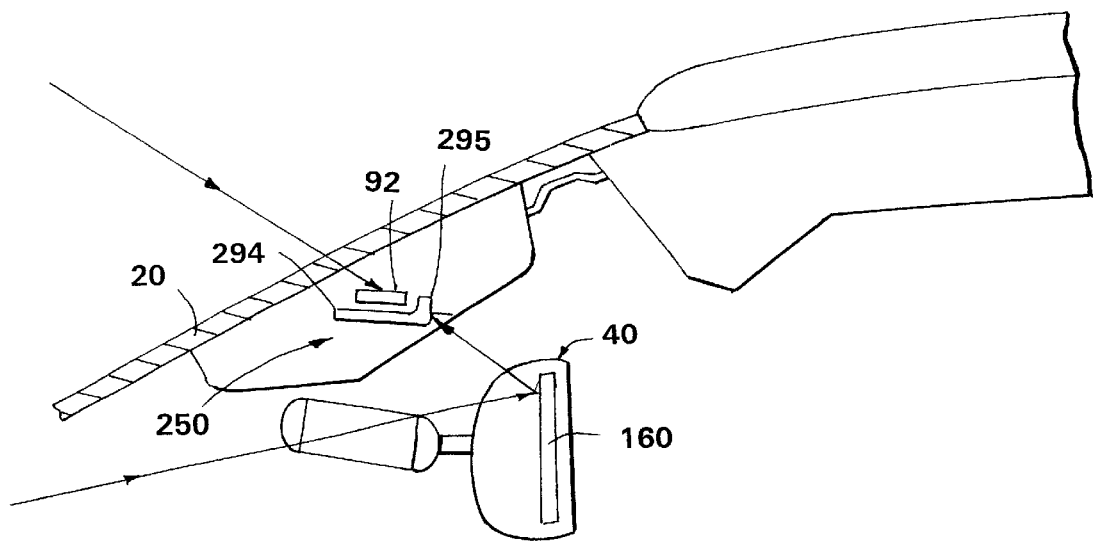
FIG. 9 is a perspective side view of a rearview mirror assembly constructed in accordance with a second embodiment of the present invention.

As illustrated in FIGS. 7 and 8, the rearview mirror assembly and the microwave receiver 80 may be substantially identical to that disclosed in U.S. Pat. No. 6,166,698. Additionally, resonator patch 92 and dielectric layer 90 may also be identical to the prior construction disclosed in the '698 patent. It should be appreciated, however, that aspects of the present invention may be implemented with other constructions or arrangements. For example, in accordance with a second embodiment of the present invention, the antenna (250) could be arranged to be substantially horizontal as shown in FIG. 9, rather than being substantially parallel to the front windshield as shown in FIGS. 7 and 8. As illustrated in FIG. 9, ground plane 294 may have a different configuration (i.e., have only on bent edge 295) so as to insure that resonant component 92 is shielded from signals reflected off of mirror 40.

Figure 10:
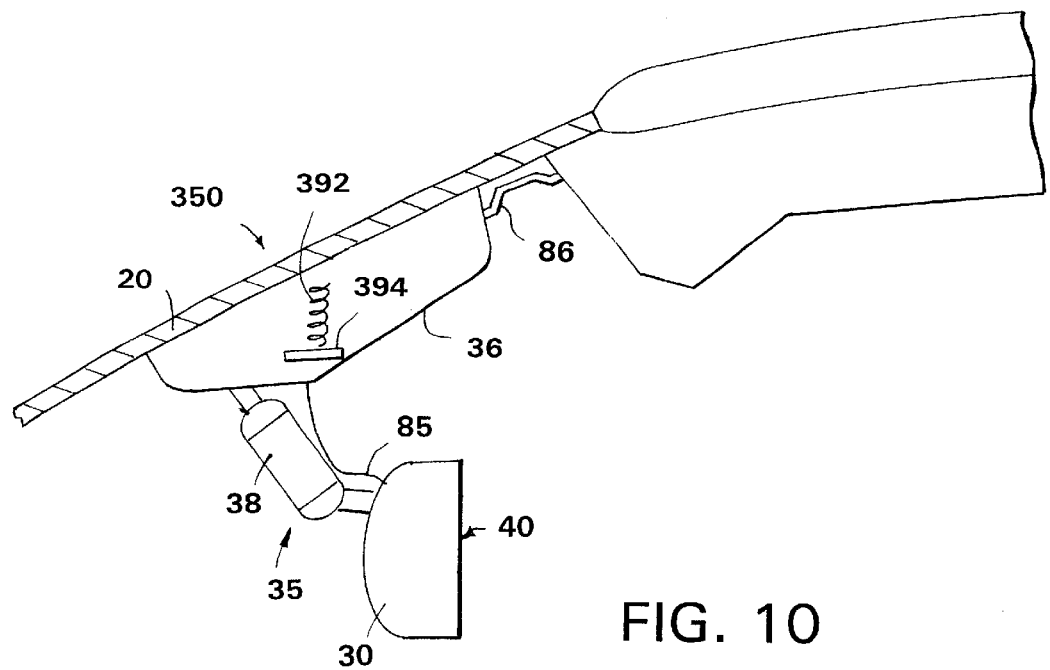
FIG. 10 is a perspective side view of a rearview mirror assembly constructed in accordance with a third embodiment of the present invention.

Those skilled in the art will also appreciate that the resonant component of the antenna may be helical or have any other structure. FIG. 10 shows an antenna 350 according to a third embodiment of the present invention in which resonant plate 92 is replaced with a helical resonant component 392. Because the satellite signal is an electromagnetic wave having an electric field component and a magnetic field component and because the mirror only reflects electric fields, the resonant component of the antenna may be configured to only sense the magnetic field component of the satellite signal and thus not sense the reflected electric field components. Helical component 392 may be mounted with its central axis vertical or it may be tilted slightly such that its central axis is angled towards the vehicle roof. Although the need to shield helical resonant component 392 from reflected satellite signals may be less important, the provision of a ground plane 394 may nevertheless be desirable to improve the strength of the signal received by helical resonant component 392.

Antenna 150 may be constructed using materials that are conventional and well known for such use. As illustrated, resonant patch 92 has a generally square shape with dimensions selected so as to tune antenna 50 to a resonant frequency at which particular satellites are transmitting. For example, GPS satellites transmit at 1.57542 GHz and GLONASS satellites transmit at 1.60256 to 1.61550 GHz, and CD radio satellites transmit at 2.31 to 2.36 GHz. The manner by which a patch antenna may be tuned to these frequencies is well known in the art. Because the windshield glass 20 forms a dielectric cover over antenna 50, the patch resonant frequency is slightly reduced from its free space value. To compensate for the effect of the glass, the patch dimensions or corners 95 of resonant patch 92 may be trimmed to compensate for this reduction in resonant frequency caused by windshield 20.

Although microwave antenna 150 is shown as having a generally planar construction, the antenna could be provided on a non-planar substrate thereby allowing greater flexibility in the mounting of antenna 150. Also, resonant patch 92 need not have a generally square shape, but may be circular, rectangular, or fractal or have any shape known in the art provided it may be tuned to receive the desired satellite transmissions. If resonant patch 192 is rectangular, two major resonant frequencies corresponding to the average X and Y dimensions may be used to simultaneously receive microwave transmissions in two different frequency bands. Thus, for example, microwave antenna 150 could be configured to simultaneously receive both GPS and GLONASS transmissions so as to allow calculation of vehicle position using satellites from both position identification systems. Other possibilities include tuning the antenna to receive GPS transmissions and to receive CD radio satellite transmissions. Such CD radio transmissions may then be supplied to the audio system of the vehicle. As will be apparent to those skilled in the art, microwave antenna 150 could be dimensioned so as to be tuned to the resonant frequency of other satellite transmissions to receive information from such satellites that may be of particular use by the electrical systems of the vehicle or that may be displayed or played back to the vehicle occupants.

Receiver circuit 80 may optionally be attached to the ground plane surface 194 on antenna 150. One preferred implementation uses a four-layer printed circuit board with layers assigned as follows: resonant patch, antenna ground plane, receiver ground plane/secondary signal layer, and a last layer including the receiver primary signal layer and component mounting. It will be appreciated, however, that receiver circuit 80 may be mounted elsewhere, such as in mirror housing 30 behind mirror 40. If such an implementation is used, however, a coaxial cable would need to extend from mounting foot 36 to mirror housing 30. Nevertheless, the length of the coaxial cable would be relatively short and could be readily connected between antenna 150 and receiver circuit 80 by the OEM manufacturer of the rearview mirror assembly, so as to eliminate the need for the end manufacturer to run and connect any such coaxial cable. Further, the mounting of the microwave antenna and receiver circuit in the same vehicle accessory assembly also allows for the system to be readily retrofit or installed by an auto dealer. For example, if the microwave antenna is mounted in the housing of an exterior rearview mirror as disclosed in WO 97/21127, the microwave receiver circuit is preferably mounted in the same housing thereby eliminating the need for running expensive coaxial cable therebetween.

As will be appreciated by those skilled in the art, the present invention may be implemented in virtually any rearview mirror assembly regardless of its particular construction. Additionally, mirror 40 may be a prismatic mirror or an electrochromic mirror. Further, the antenna could be mounted in an exterior rearview mirror assembly or elsewhere in the vehicle.

The above description is considered that of the preferred embodiments only. Modifications of the invention will occur to those skilled in the art and to those who make or use the invention. Therefore, it is understood that the embodiments shown in the drawings and described above are merely for illustrative purposes and not intended to limit the scope of the invention, which is defined by the following claims as interpreted according to the principles of patent law, including the doctrine of equivalents.

What is claimed is:

1. A rearview mirror assembly for a vehicle comprising:
    a mirror mounting structure adapted to be mounted to the vehicle, said mirror mounting structure including a mirror housing;
    a mirror mounted in said mirror housing; and
    a microwave antenna mounted to said mirror mounting structure, said microwave antenna including a conductive ground plane and a resonant component for receiving signals from a satellite, said ground plane having an area sufficiently large to substantially block satellite signals that are reflected from said mirror towards said resonant component.

2. The rearview mirror assembly of claim 1, wherein said microwave antenna further includes a dielectric substrate, said resonant component is a conductive resonant patch mounted on one side of said dielectric substrate, and said ground plane is mounted to an opposite side of said dielectric substrate.

3. The rearview mirror assembly of claim 1, wherein said mirror mounting structure further includes a mounting bracket adapted to be mounted inside the vehicle in a location proximate to or on the front windshield of the vehicle, said mirror housing is coupled to said mounting bracket, wherein said microwave antenna is mounted to said mounting bracket proximate the windshield.

4. The rearview mirror assembly of claim 3 and further including a microwave receiver circuit at least a portion of which is mounted to said mounting bracket, said microwave receiver circuit being electrically coupled to said microwave antenna.

5. The rearview mirror assembly of claim 1, wherein said mirror mounting structure is configured for mounting to the interior of the vehicle.

6. The rearview mirror assembly of claim 1, wherein said mirror mounting structure is configured for mounting to the exterior of the vehicle.

7. The rearview mirror assembly of claim 1 and further including a microwave receiver circuit electrically coupled to said microwave antenna and mounted in said mirror housing.

8. The rearview mirror assembly of claim 1, wherein said mirror is an electrochromic mirror.

9. The rearview mirror assembly of claim 1, wherein said conductive ground plane is positioned between said resonant component and said mirror.

10. A mirror mounting bracket for mounting an inside rearview mirror assembly to a vehicle, said mirror mounting bracket comprising:
    a mounting foot including a mounting portion for mounting said rearview mirror assembly to an inside surface of the front windshield of a vehicle, and an antenna housing portion abutting the inside surface of the front windshield and having an aperture opening towards the inside surface of the front windshield;
    a stem extending between said mounting portion and a mirror housing of the rearview mirror assembly; and
    a microwave antenna mounted in said aperture of said antenna housing of said mounting foot, said microwave antenna including a conductive ground plane and a resonant component for receiving signals from a satellite, said ground plane is positioned in said antenna housing to shield said resonant patch from any satellite signals that are reflected from a conductive component of the vehicle.

11. The mirror bracket of claim 10 and further including a microwave receiver circuit electrically coupled to said microwave antenna and mounted in said aperture in said antenna housing portion behind said microwave antenna.

12. The mirror bracket of claim 10, wherein said microwave antenna is tuned to receive transmissions from satellites of a position identification system constellation.

13. The mirror bracket of claim 10, wherein said microwave antenna is tuned to receive CD radio transmissions from a satellite.

14. The mirror bracket of claim 10, wherein said microwave antenna further includes a dielectric substrate, said resonant component is a conductive resonant patch mounted on one side of said dielectric substrate, and said ground plane is mounted to an opposite side of said dielectric substrate.

15. The mirror bracket of claim 10, wherein said ground plane has an area large enough to block any satellite signals that are reflected from an interior rearview mirror of the vehicle towards said resonant patch.

16. A microwave antenna for mounting in a vehicle comprising:

a dielectric substrate;

a conductive resonant patch mounted on one side of said dielectric substrate for receiving signals from a satellite; and a conductive ground plane mounted to an opposite side of said dielectric substrate, said ground plane has an area sufficiently large to shield said resonant patch from any satellite signals that are reflected from a conductive component of the vehicle that would otherwise cause destructive interference with a signal received directly from a satellite, wherein said conductive ground plane is positioned between said resonant patch and said conductive component, said resonant patch having a generally rectangular shape with the length of a first pair of opposing sides edges selected to tune the antenna to a first resonant frequency for receiving microwave transmissions from a first set of satellites, and the length of a second pair of opposing side edges selected to tune the antenna to a second resonant frequency for receiving microwave transmissions from at least one satellite of a second set of satellites, wherein said antenna is mounted in a rearview mirror assembly of a vehicle.

17. The microwave antenna of claim 16, wherein the first set of satellites are satellites of a position identification system constellation.

18. The microwave antenna of claim 17, wherein the microwave transmissions from satellites of a position identification system constellation are GPS signals.

19. The microwave antenna of claim 17, wherein the microwave transmissions from satellites of a position identification system constellation are GLONASS signals.

20. The microwave antenna of claim 17, wherein the second set of satellites are satellites of a communication system through which human voice signals are transmitted.

21. The microwave antenna of claim 20, wherein the microwave transmissions from said at least one satellite of the second set of satellites are CD radio signals.

22. The microwave antenna of claim 16, wherein the second set of satellites are satellites of a communication system through which human voice signals are transmitted.

23. The microwave antenna of claim 22, wherein the microwave transmissions from said at least one satellite of the second set of satellites are CD radio signals.

24. The microwave antenna of claim 16, wherein both the first and the second set of satellites are satellites of position identification system constellations, with the first set belonging to a different position identification system than the second set.

25. The microwave antenna of claim 24, wherein the microwave transmissions from the first set of satellites are GPS signals.

26. The microwave antenna of claim 25, wherein the microwave transmissions from the second set of satellites are GLONASS signals.

* * * * *

UNITED STATES PATENT AND TRADEMARK OFFICE
CERTIFICATE OF CORRECTION

PATENT NO. : 6,396,446 B1
DATED : May 28, 2002
INVENTOR(S) : Eric J. Walstra et al.

It is certified that error appears in the above-identified patent and that said Letters Patent is hereby corrected as shown below:

Column 3,
Line 52, insert:
 -- Another aspect of the present invention is to provide a rearview mirror assembly for a vehicle comprising a mirror housing adapted to be mounted to the vehicle, a mirror mounted in the mirror housing, and a microwave antenna mounted in the mirror housing. The microwave antenna includes a conductive ground plane and a resonant component for receiving signals from a satellite. The ground plane has an area sufficiently large to substantially block satellite signals that are reflected from the mirror towards the resonant component. --

Column 4,
Delete lines 4-21.

Signed and Sealed this

Twenty-fourth Day of August, 2004

JON W. DUDAS
*Director of the United States Patent and Trademark Office*